Patented Oct. 18, 1949

2,484,902

UNITED STATES PATENT OFFICE 2,484,902

ANTHRAQUINONE-2-CARBOXYLIC-DIMETHYLAMIDES AND PROCESS FOR MAKING SAME

Henry Charles Olpin and Kenneth Ronald House, Spondon, near Derby, England, assignors to Celanese Corporation of America, a corporation of Delaware No Drawing. Application October 18, 1946, Serial No. 704,280. In Great Britain November 2, 1945

6 Claims. (Cl. 260—377)

1

This invention relates to the production of dyestuffs, to compositions containing the dyestuffs and to the colouration of textile and other materials, particularly materials of cellulose acetate or other cellulose ester or ether.

The dyestuffs of the 1.4-diamino-anthraquinone series are of considerable value for the colouration of cellulose acetate and other cellulose ester or ether materials in blue and blue-green shades. Unfortunately, the colourations obtained with these dyestuffs are frequently of only poor resistance to burnt gas fumes, the action of which leads to reddening and dulling of the shade to an undesirable extent. This disadvantage can be largely overcome by suitable modification of the structure of the dyestuffs, but such modification is prone to reduce substantially the affinity of the dyestuff for the materials.

It has now been found that 1.4-diamino-anthraquinone-2-carboxy-methyl amides, whether mono- or di-methyl-amides, containing an aryl or hydroaryl substituent in the 1- or 4-amino group, the other amino group being unsubstituted or carrying an alkyl, especially a hydroxyalkyl substituent, form a valuable class of dyestuffs for cellulose acetate and other cellulose ester of ether materials. Dyestuffs of this class are remarkable in that they not only possess excellent affinity for the materials, but also yield colourations of high resistance to burnt gas fumes and to the other influences to which textile materials are normally subjected.

Included within the scope of the present invention are the production of the dyestuffs of the above-mentioned class, the dyestuffs themselves and compositions containing them, for example with dispersing agents, processes for the colouration of cellulose acetate and other materials with the dyestuffs and the coloured materials so produced.

The most valuable dyes for the purpose of the invention are those in which the 1- or 4-amino group, preferably the latter, carries an aryl substituent of the benzene series, especially a phenyl radicle, while the other amino group is unsubstituted or is substituted by hydroxyalkyl, e. g. β-hydroxyethyl or β-hydroxypropyl. Special mention may be made of the dyestuffs of the general formula:

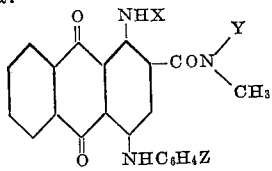

where X is hydrogen or β-hydroxethyl, Y is hydrogen or methyl, and Z is hydrogen or methoxy.

The dyestuffs of the invention are remarkable

2 in that their affinity for cellulose acetate and like materials is superior to that of analogous dyestuffs differing only in containing a simple amide group or amide groups substituted by alkyl higher than methyl, e. g. ethyl radicles. In this connection it is of particular interest to note that the carboxy-dimethylamides of the invention have much better affinity than both the isomeric carboxymonoethylamides and the carboxy-diethylamides possessing the same substituents in other parts of the molecule. As compared with the mono-methylamides, the dimethylamides differ in producing somewhat redder shades, which tend to maintain their tone even better than those obtained with the monomethylamides on prolonged exposure to burnt gas fumes.

The invention includes the following methods (designated A and B respectively) of making the new dyes:

(A) An anthraquinone derivative containing the desired 2-carboxy-methyl-amide group and one of the required amino substituents and having a halogen atom in para position to the existing amino substituent is treated with the appropriate amine so as to replace the halogen atom by the other required amino substituent. In particular a 1-amino or 1-alkylamino-4-bromanthraquinone-2-carboxylic - methylamide may be allowed to react with the requisite aromatic or hydroaromatic amine, for example aniline, o-, m-, or p-anisidine, p-toluidine, m-toluidine, cyclo-hexylamine, or a nuclear methyl-cyclo-hexylamine. In general the reaction is facilitated by the presence of copper acetate. Again a 1-aryl-amino or 1-hydroarylamino-4-bromanthraquinone-2 - carboxylic-methylamide may be subjected to the action of ammonia or a primary aliphatic amine, for example methylamine, ethanolamine, beta-hydroxypropylamine or beta-cyano-ethylamine, so as to replace the 4-bromine atom by amino or aliphatically substituted amino. For example the 1-(p-tolylamino)-4-brom-anthraquinone - 2 - carboxylic-methylamide obtainable by brominating 1-tolyl-amino-anthraquinone-2 - carboxylic-monomethylamide may be subjected to the action of ammonia, methylamine, or beta-cyanoethyl-amine.

(B) An anthraquinone derivative differing from the required dye by the presence of a carboxylic chloride group in place of the carboxylic amide group is subjected to the action of mono- or di-methylamine to convert the carboxylic chloride group into the required carboxylic mono- or dimethyl amide group. Thus a 1-amino-or 1-alkylamino-4-arylamino or 4-hydroarylaminoanthraquinone- 2 -carboxylic chloride may be subjected to the action of mono methylamine.

The dyes can also be produced by various other methods which, though chemically equivalent in the sense that they yield the same products, are in general far less convenient or satisfactory than methods (A) and (B) outlined above.

For example method (A) may be modified by using as material to react with the amine, an anthraquinone 2-carboxy-mono- or di-methyl amide derivative containing instead of the nuclear halogen atom, another substituent capable of being replaced by an amino or substituted amino group by the action of ammonia or an amine, for example a nitro group, an alkoxy group, or an aryloxy group. Again method (B) may be modified by using an anthraquinone compound containing, in place of the carboxylic chloride group specified, another group capable of being converted into the required carboxylic mono- or di-methyl amide group by the action of mono- or di-methylamine, for example a carboxylic bromide group or a carboxylic ester group.

Still other methods of manufacturing the dyestuffs are the following:

(a) To produce a dyestuff containing a 1- or 4-primary amino group, the reduction of the corresponding 1- or 4-nitro compound.

(b) The 1- or 4-N-alkylation or hydroxy- alkylation of an anthraquinone-2-carboxylic-mono- or di-methylamide containing in the 1- or 4-position a primary amino group and in the other of those positions an arylamino group or hydro-arylamino group.

(c) The hydrolysis of an N-acidyl derivative, particularly an N-p-toluene sulphonyl derivative, of the desired dyestuff under conditions such as to avoid substantial hydrolysis of the carboxy-mono- or di-methylamide group.

The invention includes both the manufacture of the dyes and the colouration of cellulose acetate or other cellulose esters or ethers therewith. For this purpose the dyestuffs are advantageously applied to the materials in the form of aqueous dispersions which can be prepared in any convenient way, for example with the aid of dispersing agents and/or protective colloids. The invention includes preparations, and particularly concentrated preparations, for this purpose, e. g. in powder, paste or other form, comprising the new dyestuffs together with the dispersing agents and/or protective colloids. Apart from cellulose acetate itself, the new dyestuffs are valuable, for axmples, for dyeing cellulose propionate, cellulose butyrate, cellulose acetate-propionate and acetate-butyrate and ethyl and benzyl celluloses. The new dyestuffs are also applicable to other materials which are relatively hydrophobe as compared with cotton or regenerated cellulose. Examples of such other materials are polyhexamethylene adipamide and co-polymers of vinyl chloride and vinyl acetate.

Those of the dyestuffs of the invention which contain hydroxyalkyl groups may be converted into acid phosphoric esters, which have affinity not only for cellulose derivative and other relatively hydrophobe materials, but also for wool and natural silk. Conversion to such esters may be effected, for example, by treatment with highly concentrated sulphuric acid or with chlorsulphonic acid in the presence of pyridine or other tertiary base, or by other suitable sulphating or phosphating agents.

The invention is illustrated by the following examples, all parts being by weight.

*Example 1*

16 parts 1-hydroxyethylamino-4-brom-anthraquinone-2-carboxy-methylamide, 8 parts potassium acetate, 0.2 part copper acetate, 48 parts amyl alcohol and 24 parts aniline are refluxed with stirring for 1–1½ hours. After standing for 48 hours, the product is filtered off and washed with ethanol and water. The 1-hydroxyethylamino - 4 - phenylamino - anthraquinone-2-carboxy-methylamide so produced has excellent affinity for cellulose acetate materials, which it dyes in greenish-blue shades. The colourations are of very good fastness to light and to the action of burnt gas fumes.

*Example 2*

20 parts 1-amino-4-brom-anthraquinone-2-carboxy-methylamide, 10 parts potassium acetate, 0.2 part copper acetate and 80 parts of aniline are heated for about 3 hours at 130° with stirring. After cooling somewhat, the product is poured into a mixture of 350 parts of concentrated hydrochloric acid and 320 parts of ice and water. The mixture is stirred for 1 hour and the precipitated dyestuff is then filtered off and washed with water.

The 1-amino-4-phenylamino-anthraquinone-2-carboxy-methylamide so produced has excellent affinity for cellulose acetate materials, on which it produces a blue colouration of very good fastness to light and to the action of burnt gas fumes.

*Example 3*

20 parts 1-amino-4-brom-anthraquinone-2-carboxy-methylamide, 0.2 part copper acetate, 10 parts potassium acetate, 20 parts p-anisidine and 80 parts amyl alcohol are refluxed for 2 hours. After standing for 24 hours, the dyestuff, which has crystallised out, is filtered off and washed with a little ethanol and then with much hot water.

The 1-amino-4-p - methoxyphenylamine-anthraquinone-2-carboxy - methylamide so produced has excellent affinity for cellulose acetate materials, on which it gives a somewhat greener blue colouration than the product of Example 2. This colouration is of very good fastness to light and to the action of burnt gas fumes.

*Example 4*

10 parts 1-amino-4-brom-anthraquinone-2-carboxy-dimethylamide, 5 parts potassium acetate, 0.1 part copper acetate and 40 parts aniline are stirred at 130° for 4 hours. When cool, the mass is added to 210 parts of a mixture of equal volumes of concentrated hydrochloric acid and water, stirred for some time, the dyestuff filtered off and washed well with water.

The 1-amino-4-phenylaminoanthraquinone-2-carboxy-dimethylamide so produced has excellent affinity for cellulose acetate materials, on which it produces a blue shade somewhat redder than that obtained with the product of Example 2. The fastness of this colouration both to light and to the action of burnt gas fumes is very good.

*Example 5*

100 parts of 1-amino-4-cyclohexylamino-anthraquinone-2-carboxylic acid is suspended in 1000 parts of dry benzene and 150 parts of phosphorus pentachloride added gradually. The suspension is stirred for 2 hours at ordinary temperature whereupon the acid chloride so formed is filtered off, dried, and suspended in 5 to 10 times its weight of aqueous dimethylamine of 20% strength. After stirring for one hour the resulting 1 - amino-4 - cyclohexylamino-anthraquinone-2-carboxylic-dimethylamide is filtered off, washed and dried. It dyes cellulose acetate in blue shades. Its affinity for cellulose acetate is better than that of the corresponding 4-phenyl-amino compound but it is rather less resistant to combustion products of coal gas.

Example 6

1-amino-4-phenylamino-anthraquinone-2-carboxylic-dimethylamide is prepared by substituting 1-amino-4-anilido-anthraquinone-2-carboxylic acid for the corresponding 4-cyclohexyl-amino compound specified in Example 5. The product is the same as that of Example 4.

Having described our invention, what we desire to secure by Letters Patent is:

1. An anthraquinone-2-carboxylic dimethyl amide having an NH₂ group in the 1-position and in the 4-position a group NHR where R is selected from aryl groups containing but a single ring and hydro-aryl groups containing but a single ring.

2. 1-amino-4-phenylamino-anthraquinone-2-carboxylic-dimethylamide.

3. 1-amino-4-cyclohexylamino-anthraquinone-2-carboxylic dimethyl amide.

4. Process for the production of a 1-amino-4-substituted amino-anthraquinone-2-carboxylic dimethyl amide, which comprises subjecting an anthraquinone-2-carboxylic dimethyl amide having an NH₂ group in the 1-position and a halogen atom in the 4-position to the action of an amine selected from the group consisting of primary arylamines containing but a single ring and primary hydro-arylamines containing but a single ring.

5. Process for the production of 1-amino-4-phenylamino-anthraquinone-2-carboxylic dimethyl amide, which comprises subjecting a 1-amino-4-brom-anthraquinone-2 carboxylic dimethyl amide to the action of aniline.

6. Process for the production of 1-amino-4-cyclohexylamino-anthraquinone-2-carboxylic dimethyl amide, which comprises subjecting 1-amino-4-brom-anthraquinone-2-carboxylic dimethyl amide to the action of cyclohexylamine.

HENRY CHARLES OLPIN.
KENNETH RONALD HOUSE.

REFERENCES CITED

The following references are of record in the file of this patent:

UNITED STATES PATENTS

| Number | Name | Date |
|---|---|---|
| 1,871,821 | Nawiasky et al. | Aug. 16, 1932 |
| 2,059,476 | Nawiasky et al. | Nov. 3, 1936 |
| 2,176,437 | Runne et al. | Oct. 17, 1939 |
| 2,294,595 | Ellis et al. | Sept. 8, 1942 |

FOREIGN PATENTS

| Number | Country | Date |
|---|---|---|
| 605,595 | Germany | Nov. 16, 1934 |